No. 743,398. PATENTED NOV. 3, 1903.
R. W. SCOTT, L. N. D. WILLIAMS & H. SWINGLEHURST.
MECHANICAL MOVEMENT FOR USE IN KNITTING MACHINES.
APPLICATION FILED MAR. 25, 1902.
NO MODEL. 5 SHEETS—SHEET 1.

No. 743,398. PATENTED NOV. 3, 1903.
R. W. SCOTT, L. N. D. WILLIAMS & H. SWINGLEHURST.
MECHANICAL MOVEMENT FOR USE IN KNITTING MACHINES.
APPLICATION FILED MAR. 25, 1902.
NO MODEL. 5 SHEETS—SHEET 5.
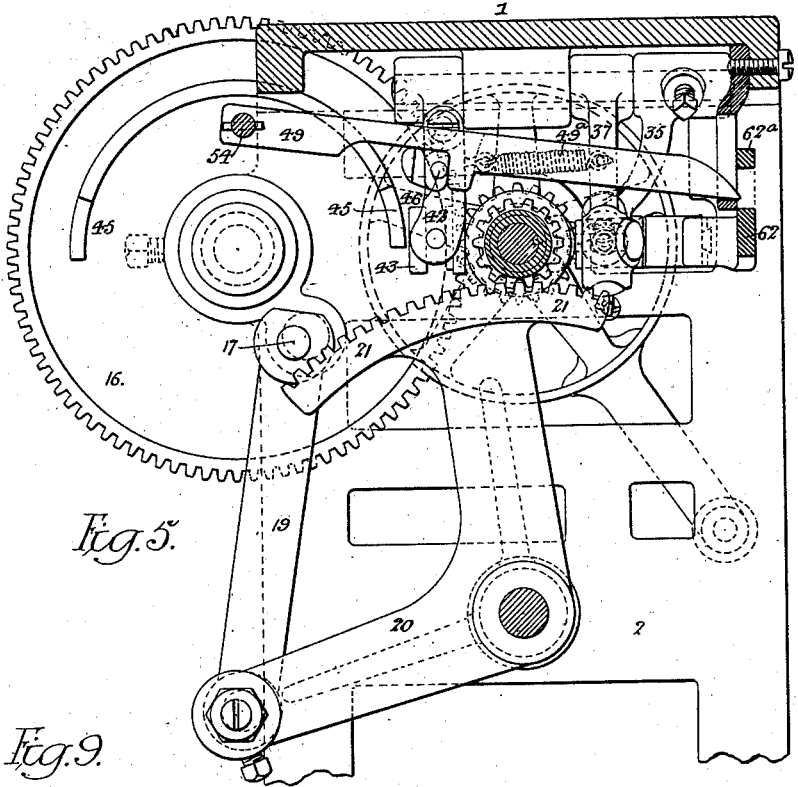
Fig. 5.
Fig. 9.
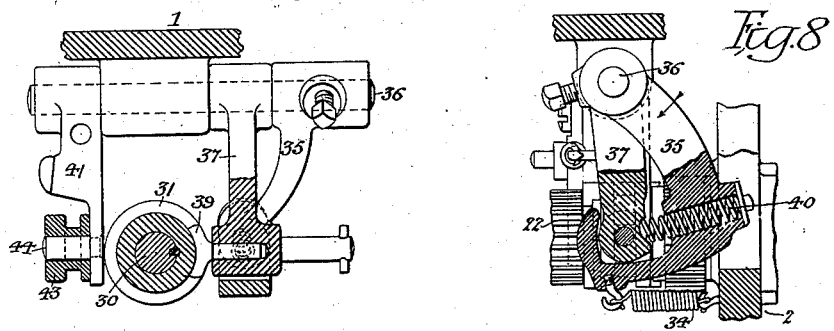
Fig. 8.
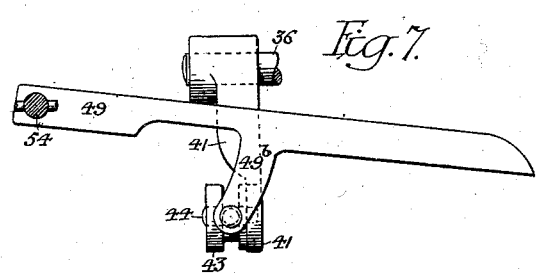
Fig. 7.
Witnesses:—
Inventors:—
Robert W. Scott,
Louis N. D. Williams,
Harry Swinglehurst,
by their Attorneys;

No. 743,398. Patented November 3, 1903.

UNITED STATES PATENT OFFICE.

ROBERT W. SCOTT, OF PHILADELPHIA, LOUIS N. D. WILLIAMS, OF ASHBOURNE, AND HARRY SWINGLEHURST, OF PHILADELPHIA, PENNSYLVANIA, ASSIGNORS TO SAID SCOTT AND WILLIAMS.

MECHANICAL MOVEMENT FOR USE IN KNITTING-MACHINES.

SPECIFICATION forming part of Letters Patent No. 743,398, dated November 3, 1903.

Original application filed September 4, 1901, Serial No. 74,307. Divided and this application filed March 25, 1902. Serial No. 99,864. (No model.)

*To all whom it may concern:*

Be it known that we, ROBERT W. SCOTT, of Philadelphia, LOUIS N. D. WILLIAMS, of Ashbourne, and HARRY SWINGLEHURST, of Philadelphia, Pennsylvania, all citizens of the United States, have invented certain Improvements in Mechanical Movements for Use in Knitting-Machines, (the same being a division of our application, Serial No. 74,307, filed September 4, 1901, patented April 15, 1902, No. 697,953,) of which the following is a specification.

Our invention relates to certain improvements in circular-knitting machines of the type shown in Letters Patent No. 552,806, dated January 7, 1896, and No. 575,191, dated January 12, 1897, the improvements relating to the means employed for changing from round-and-round to to-and-fro knitting.

The special features of construction and combinations of parts forming the subject of the invention will be fully described and specifically claimed hereinafter.

Figure 1:
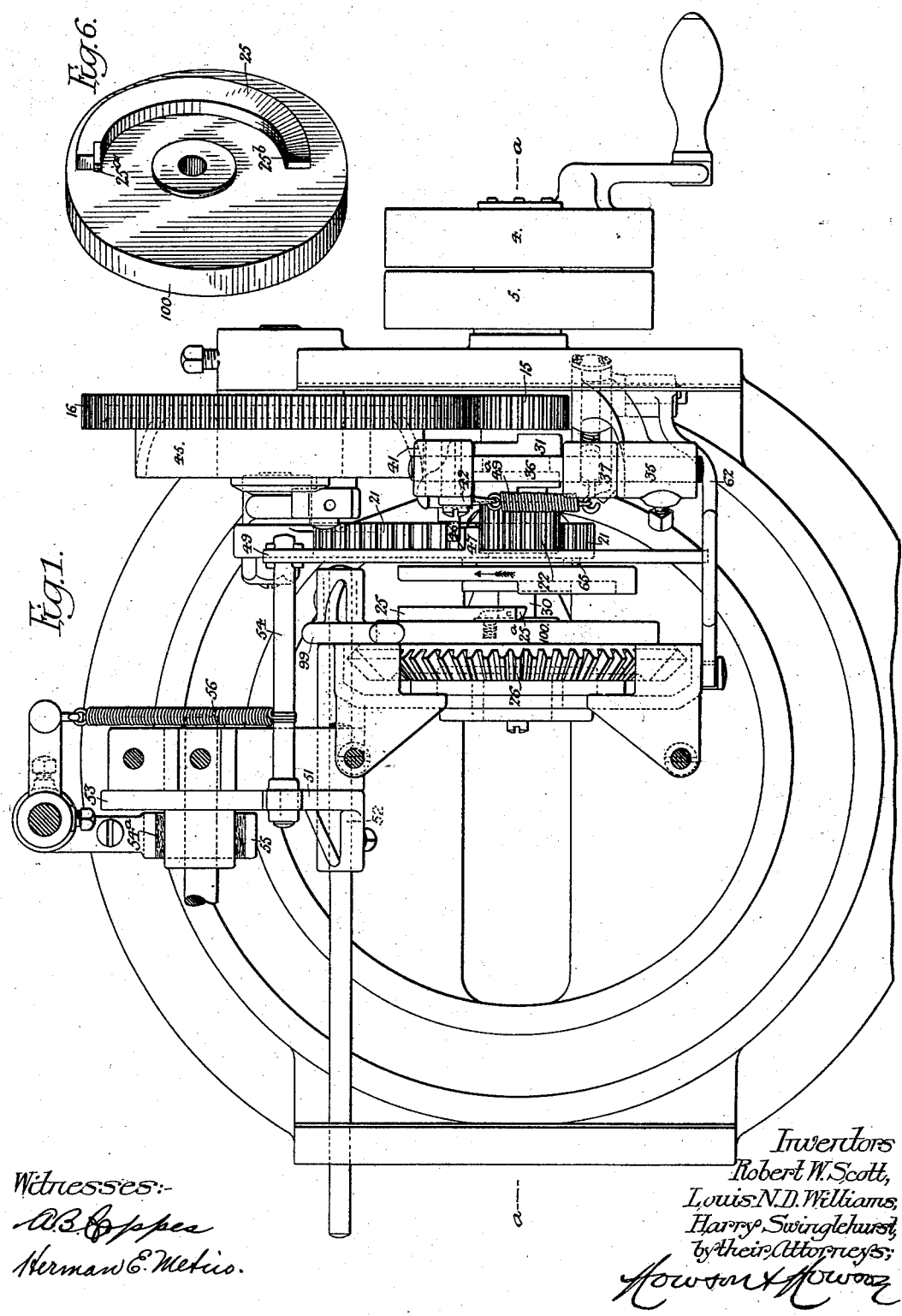
Figure 2:
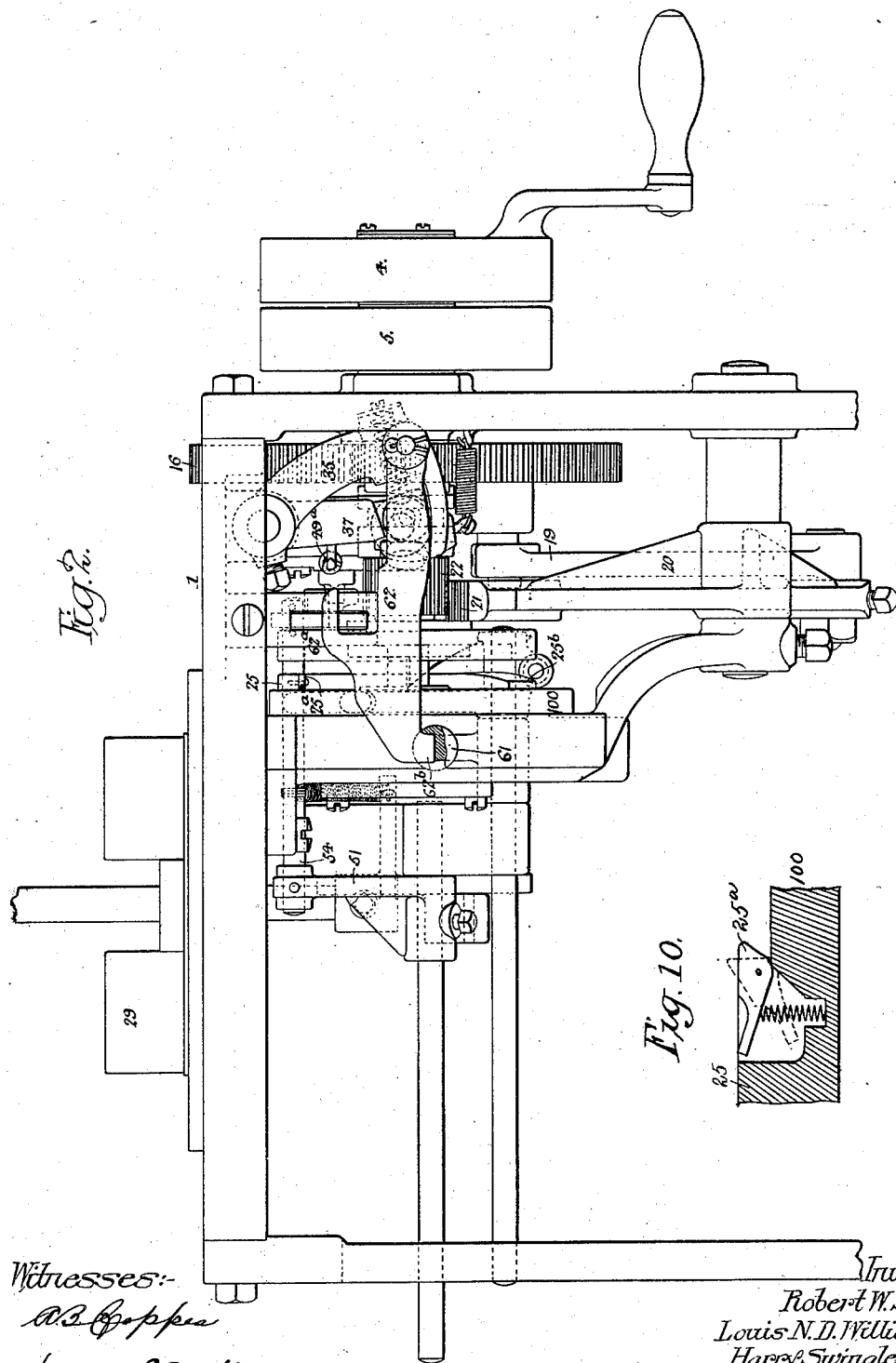
Figure 3:
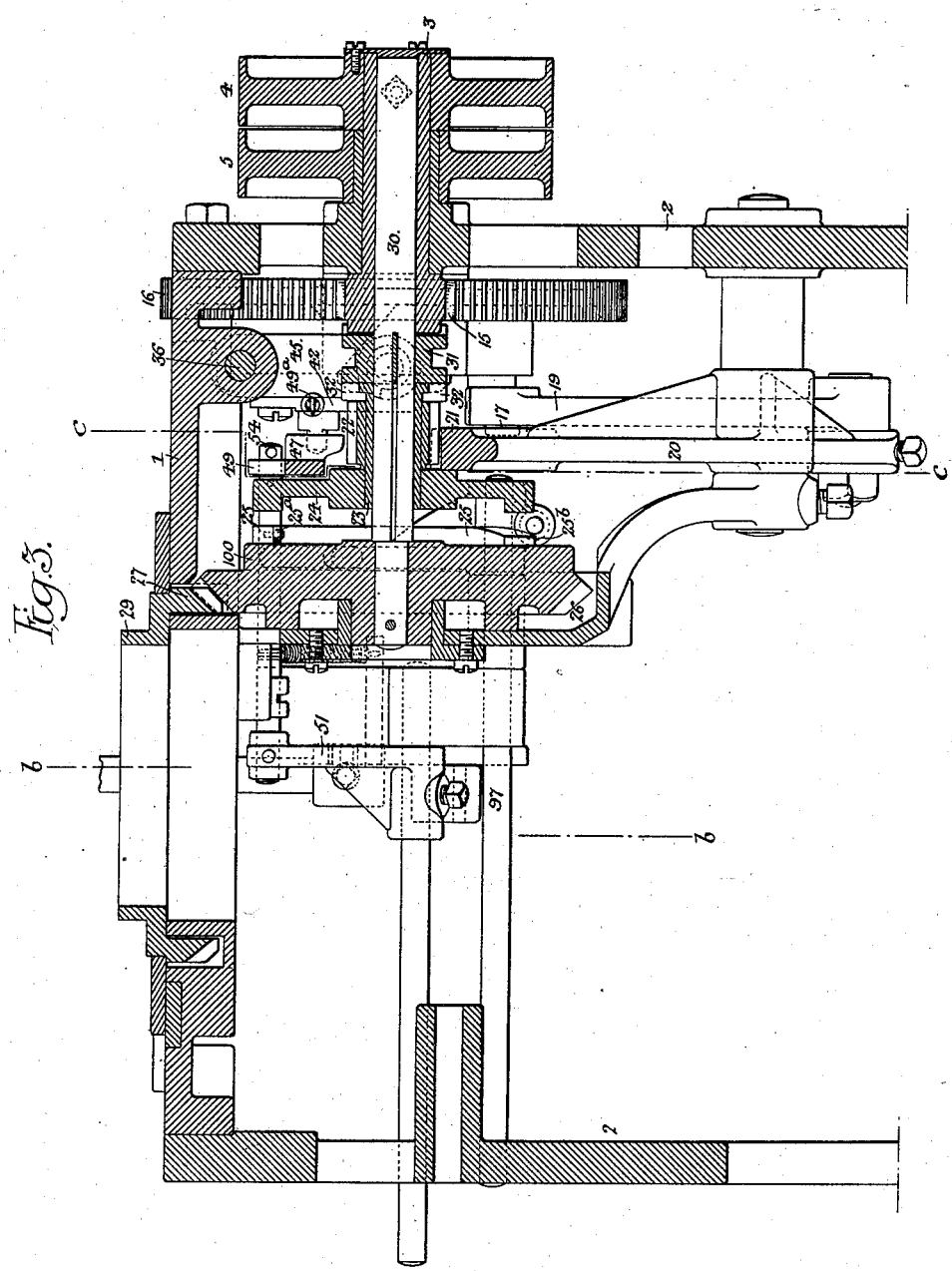
Figure 4:
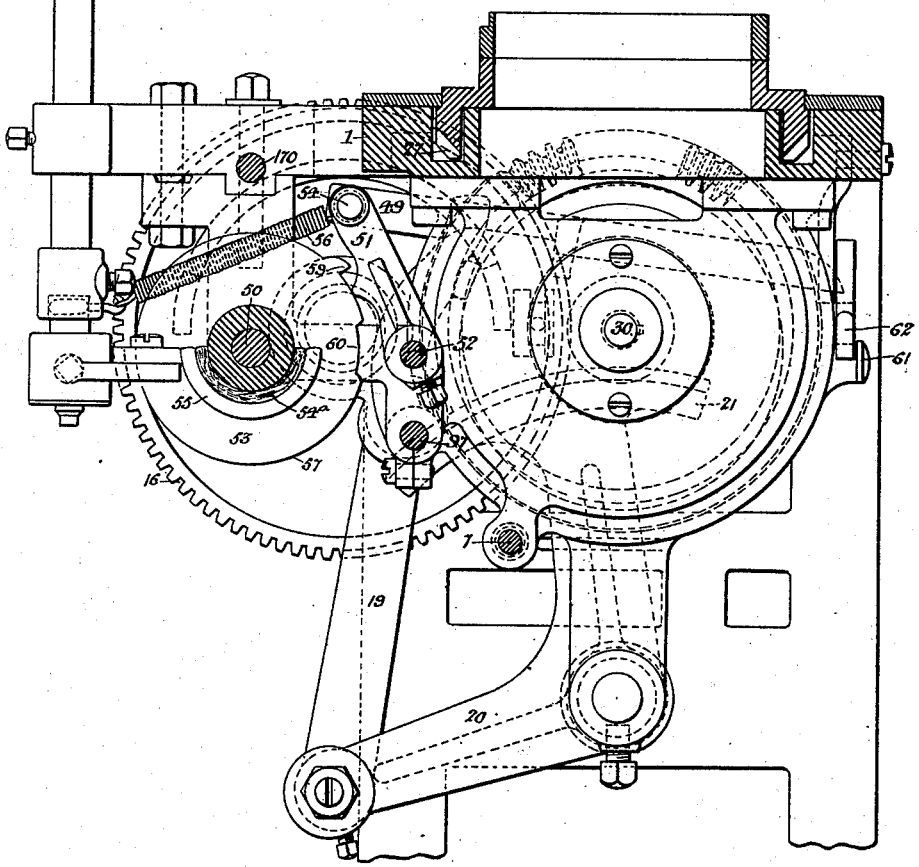

In the accompanying drawings, Figure 1 is a plan view of sufficient of the machine to illustrate the present improvements, the table or bed and the parts above the same having been removed. Fig. 2 is a front view of the same. Fig. 3 is a view of the machine, partly in elevation and partly in longitudinal section, on the line *a a*, Fig. 1. Fig. 4 is a view, partly in elevation and partly in section, on the line *b b*, Fig. 3. Fig. 5 is a transverse section of the machine on the line *c c*, Fig. 3; and Figs. 6 to 10, inclusive, are views of parts of the mechanism not shown with sufficient clearness in the general views.

The fixed table or bed 1 of the machine is mounted upon a suitable supporting-framework 2, one of the side frames having a bearing for a tubular shaft 3, to which is secured a belt-pulley 4 for receiving the driving-belt, a loose pulley 5 running alongside of the pulley 4 and being mounted so as to turn freely on a hub or boss projecting from the end frame 2 and surrounding the tubular shaft 3. (See Figs. 2 and 3.)

The tubular shaft 3 has at its inner end a pinion 15, which meshes with a spur-wheel 16, mounted so as to be free to turn upon a suitable stud on one of the end frames 2, this spur-wheel having a crank-pin 17, which is connected by a rod 19 to one arm of a bell-crank lever 20, also mounted so as to be free to swing on a stud on one of the end frames 2, the other arm of said lever having a toothed segment 21, which meshes with a pinion 22 on a sleeve 23, which carries a clutch member 24, adapted to engage with a like clutch member 25 on a bevel-wheel 26, which meshes with a bevel-pinion 27 on the circular cam-box 29 of the machine, this cam-box being suitably mounted upon the table 1, so as to be capable of free rotation thereon. (See Figs. 3, 4, and 5.)

The bevel-wheel 26 is secured to a shaft 30, to which is splined a clutch-collar 31, having at one end teeth adapted to engage with notches in the hub of the pinion 15, and at the other end flanged fingers 32 for engaging with the flanged end of the sleeve 23, as shown in Fig. 3. Hence said sleeve is confined to the clutch-collar so far as longitudinal movement is concerned, but is free to rotate independently of said clutch-collar. The clutch member 24 bears such longitudinal relation to the clutch-sleeve 31 that when the latter is in engagement with the hub of the pinion 15 the clutch member 24 will be free from engagement with the clutch member 25 of the bevel-wheel 26, as shown in Fig. 3. Consequently the latter wheel will have rotating movement imparted to it; but when the clutch-collar 31 is moved to the left, so as to free it from engagement with the hub of the pinion 15 and bring the clutch members 24 and 25 into engagement, a back-and-forth movement will be imparted to the bevel-wheel 26, which movement is considerably slower than the rotating movement owing to the difference in the diameters of the pinion 15 and spur-wheel 16 and to the fact that the throw of the crank-pin 17 in respect to the radius of the arms of the bell-crank lever 26 is such that several turns of the shaft 3 are required in order to effect one back-and-forth reciprocation of the pinion 22.

The clutch-collar 31 is normally held in engagement with the hub of the pinion 15 by means of a spring 34, Fig. 8, connected to one of the end frames 2 and to the hooked lower end of an arm 35 on a rock-shaft 36, which is mounted in a bracket on the under side of the table 1 and has another depending arm 37, which has a limited amount of swing in the hooked lower end of the arm 35, and is provided with a shoe 39, Fig. 9, engaging with a groove in the clutch-collar 31.

A spring 40 is interposed between the lower end of the arm 37 and a recessed portion of the arm 35, as shown in Fig. 8. Hence when said arm 35 is moved in the direction of the arrow shown in said figure the spring 40 tends to move the arm 37, so as to carry the clutch-collar 31 out of engagement with the clutch of the pinion 15 and move the clutch members 24 and 25 into engagement, the spring 40 permitting movement of the arm 35 independently of the arm 37 when the parts of the clutch members 24 and 25 are not in position for engagement and the arm 37 being moved by the spring as soon as said parts come into proper engaging position.

The flange or rib of the clutch member 25 has at one end a spring-actuated latch 25$^a$, projecting beyond the end of the rib, as shown in Figs. 3, 6, and 10, the opposite end of the rib being beveled or reduced in height, as shown at 25$^b$ in Figs. 2, 3, and 6. The purpose of this construction is to prevent the clutch member 24 from engaging with the clutch member 25 except when said member 24 is moving in a certain direction—in the present instance the direction indicated by the arrow in Fig. 1—whereby the reciprocating movement of the cam-cylinder will always be started in the same direction and there will be no derangement of operation of the parts coöperating therewith, as there is likely to be if said cam-cylinder starts to reciprocate sometimes in one direction and sometimes in the other.

Supposing that the ribs or flanges of the two clutch members are in contact with each other, there can be no engagement of the ends of the same when the member 24 is running in a direction the reverse of the arrow, Fig. 1, for the retreating end of the rib of said clutch member 24 is supported by the latch 25$^a$ until its advancing end has passed the beveled end of the rib of the clutch member 25.

When the clutch member 24 is running in the direction of the arrow, however, the retreating end of its rib, descending the beveled end of the rib of the clutch member 25, permits the advancing end to engage with the opposite end of the rib of said clutch member 25, the spring-latch 25$^a$ yielding to the pressure. The beveled or reduced portion may be formed on one rib and the yielding latch may be carried by the other, if desired, the provision of the bevel and latch upon the same rib not being essential to the proper operation of the device.

The shaft 36 has a third arm 41, Fig. 9, to which is pivoted a transversely-swinging arm 42, engaging with a grooved collar 43, Fig. 5, which is free to slide on a pin 44 on the arm 41, so as to be carried into and out of engagement with a cam 45 on the spur-wheel 16.

The arm 42 has a projecting lug 46, which is acted upon by a lug 47, Fig. 3, on a bar 49, hung to a rod 54, which projects from the upper end of an arm 51, the latter being mounted upon a shaft 52 at the rear of the machine and being acted upon by cams on a cam-disk 53, which, with the other cam-disks hereinafter referred to, is secured to a longitudinal cam-shaft 50, mounted so as to be free to turn in suitable bearings at the rear of the machine, a segmental friction-pad 54$^a$, carried by a cup 55, which is secured to a fixed portion of the machine, having a bearing upon the hub of the cam-disk 33 and serving to prevent movement of the same and of the shaft 50 due to momentum. (See Fig. 4.)

The rod 54 is acted upon by a coiled spring 56, tending to draw it rearward and maintain a lug of the arm 51 constantly in contact with the periphery of the cam-disk 53. The said cam-disk 53 has most of its peripheral surface in one segmental surface, as represented at 57 in Fig. 4; but this disk has a lug 59 and a recess 60. Hence the collar 43 can occupy three different positions—namely, an intermediate position, such as shown in Fig. 5, when the lug on the arm 51 is bearing upon the segment 57, and two extreme positions, one inwardly beyond said intermediate position when the lug of the arm 51 occupies the recess 60 and the other outwardly beyond said intermediate position when the lug of the arm 51 is acted upon by the lug 59.

When in the inner extreme position, the collar 43 is acted upon by the cam 45 on the inner face of the spur-wheel 16, which cam imparts such movement to the arm 41, shaft 36, and arms 35 and 37 as to move the clutch-hub 31 out of engagement with the pinion 15 and the clutch members 24 and 25 into engagement, so as to change the movement of the cam-cylinder 29 from a rotating to a to-and-fro movement. The clutch-hub is retained in this position by reason of the engagement of a lug 61 on the fixed frame with a lug 62$^b$ at one end of a bar 62, hung to the lower end of the arm 35; but said bar 62 has a hook 62$^a$, (shown in Fig. 2,) and when the bar 49 occupies the forward limit of its movement under the action of the lug 59 of the cam 53 and the spring 49$^a$, which exerts a forward pull upon the bar 49, the cam-shaped forward end of said bar acts upon said hook 62$^a$, so as to lift the bar 62 and free the lug 62$^b$ of the same from engagement with the lug 61, as shown in Fig. 2, thereby permitting the clutch-hub 31 to again engage with the pinion 15 and cause a resumption of the rotating movement of the machine. The collar 43 can, if desired, be operated directly by an arm or projection on the bar 49—as shown, for instance, at 49$^b$ in Fig. 7.

Having thus described our invention, we claim and desire to secure by Letters Patent—

1. The combination of the driving-shaft having a rotated clutch member, an oscillated clutch member, and a longitudinally-movable clutch-sleeve, with means for moving the latter, comprising a shaft having loosely mounted thereon an arm engaging said clutch-sleeve, another arm fixed to the shaft, and a spring interposed between the two arms and through the medium of which the fixed arm imparts movement to the loosely-mounted arm, substantially as specified.

2. The combination of the driving-shaft having a rotated clutch member and an oscillated clutch member, an intervening longitudinally-movable clutch-sleeve, a shaft having an arm loosely mounted thereon and engaging said clutch-sleeve, another arm fixed to the shaft and having a hooked end within which the loose arm has a limited amount of play, and a spring interposed between the two arms and serving to impart the movement of the fixed arm to the loosely-mounted arm, substantially as specified.

3. The combination of the driving-shaft having a rotated clutch member and an oscillated clutch member, with a rock-shaft controlling the movement of said clutch, said rock-shaft having an arm with movable collar thereon, a cam for acting on said collar, and means for moving the collar into and out of the path of the cam, substantially as specified.

4. The combination of the driving-shaft having a rotated clutch member, and an oscillated clutch member, with a rock-shaft controlling the movement of said clutch, said rock-shaft having a depending arm, with a second arm pivoted so as to swing transversely thereon, and a rotating wheel having a cam for imparting movement to said arm on the rock-shaft through the medium of its transversely-swinging arm, substantially as specified.

5. The combination of the driving-shaft having a rotated clutch member and an oscillated clutch member, a longitudinally-adjustable clutch-sleeve, a rock-shaft having operative connection therewith, an arm on said rock-shaft, a transversely-swinging arm pivoted to said arm on the rock-shaft, a sliding collar mounted on the rock-shaft arm and engaged by said transversely-swinging arm, and a rotating wheel having a cam for engaging with said sliding collar, substantially as specified.

6. The combination of the driving-shaft having a rotated clutch member and an oscillated clutch member, a rock-shaft having operative connection with said clutch, an arm on said rock-shaft, a transversely-swinging arm pivoted to the arm on the rock-shaft, a rotating wheel having a cam whereby said rock-shaft arm is operated through the medium of the transversely-swinging arm thereon, and a reciprocated bar engaging said transversely-swinging arm to move it to different positions, substantially as specified.

7. The combination of the driving-shaft having a rotated clutch member and an oscillated clutch member, a rock-shaft having operative connection with said clutch, an arm on said rock-shaft, a sliding collar mounted on said arm, a cam for acting on the collar, and a reciprocated bar having connection with the collar for moving it into and out of range of the cam, substantially as specified.

8. The combination of the driving-shaft having a rotated clutch member and an oscillated clutch member, a longitudinally-adjustable clutch-sleeve, mechanism for moving said clutch-sleeve from one position to another, a locking-bar for holding it in one of its extreme positions, and a reciprocated bar acting upon both the clutch-sleeve mechanism and upon said locking-bar so as to trip the latter, substantially as specified.

9. The combination of the driving-shaft having a rotated clutch member and an oscillated clutch member, with a rock-shaft controlling the movement of said clutch, said rock-shaft having thereon an arm with movable collar, a cam for acting on said collar, and a transversely-swinging arm mounted on the rock-shaft arm and engaging with the collar of the same to move it into and out of range of the cam, substantially as specified.

10. The combination of the driving-shaft having a rotated and an oscillated clutch member, a rock-shaft controlling the movement of said clutch, a locking-bar for holding the clutch in one of its extreme positions, an arm on said rock-shaft having a movable collar, a cam for acting on said collar, and a reciprocating bar having connection with the collar to move it into and out of range of the cam, said bar also acting upon the locking-bar to trip the latter, substantially as specified.

11. The combination of the driving-shaft having a rotated clutch member and an oscillated clutch member, a rock-shaft controlling the movement of said clutch, a locking-bar for holding the clutch in one of its extreme positions, an arm on said rock-shaft having mounted upon it a transversely-swinging arm, a cam, means whereby said cam is caused to act upon the rock-shaft arm through the medium of the transversely-swinging arm of the same, and a reciprocating bar acting both upon the swinging bar to move the same to and fro and upon the locking-bar to trip the latter, substantially as specified.

12. The combination of the driving-shaft having a rotated clutch member and an oscillated clutch member, a rock-shaft controlling said clutch, a locking-bar for holding the clutch in one of its extreme positions, an arm on the rock-shaft, a sliding collar mounted on said arm, a cam for acting on said sliding collar, a transversely-swinging arm mounted on the arm of the rock-shaft and engaging said collar, and a reciprocated bar acting upon said transversely-swinging arm to move the collar into and out of range of the cam, said bar also acting upon the locking-bar to trip the latter, substantially as specified.

13. The combination of the driving-shaft having a rotated clutch member and an oscillated clutch member, a clutch-sleeve, mechanism for moving said sleeve from one position to another, a locking-bar for retaining it in one of its extreme positions, a reciprocated bar having a portion for engaging with an element of the clutch-shifting mechanism, and another portion for acting upon the locking-bar, and mechanism for adjusting said reciprocating bar to an intermediate position and to opposite extreme positions, substantially as specified.

In testimony whereof we have signed our names to this specification in the presence of two subscribing witnesses.

ROBERT W. SCOTT.
LOUIS N. D. WILLIAMS.
HARRY SWINGLEHURST.

Witnesses:
FREDK. C. EBERHARDT,
F. L. LYLE.